No. 745,090. PATENTED NOV. 24, 1903.
H. C. ZENKE.
LETTER OPENER.
APPLICATION FILED MAY 25, 1903.
NO MODEL.

WITNESSES:
A. B. Mattingly
Theo. G. Hoster

INVENTOR
Henry C. Zenke
BY
Munn
ATTORNEYS.

THE NORRIS PETERS CO., PHOTO-LITHO., WASHINGTON, D. C.

No. 745,090. Patented November 24, 1903.

UNITED STATES PATENT OFFICE.

HENRY C. ZENKE, OF NEW YORK, N. Y.

LETTER-OPENER.

SPECIFICATION forming part of Letters Patent No. 745,090, dated November 24, 1903.

Application filed May 25, 1903. Serial No. 158,682. (No model.)

*To all whom it may concern:*

Be it known that I, HENRY C. ZENKE, a citizen of the United States, and a resident of the city of New York, borough of Brooklyn, in the county of Kings and State of New York, have invented a new and Improved Letter-Opener, of which the following is a full, clear, and exact description.

The object of the invention is to provide a new and improved letter-opener which is simple and durable in construction, very effective in operation, and arranged to enable the operator to quickly and accurately open a bunch of letters of various sizes and shapes at one operation without danger of injuring the contents of the envelops.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
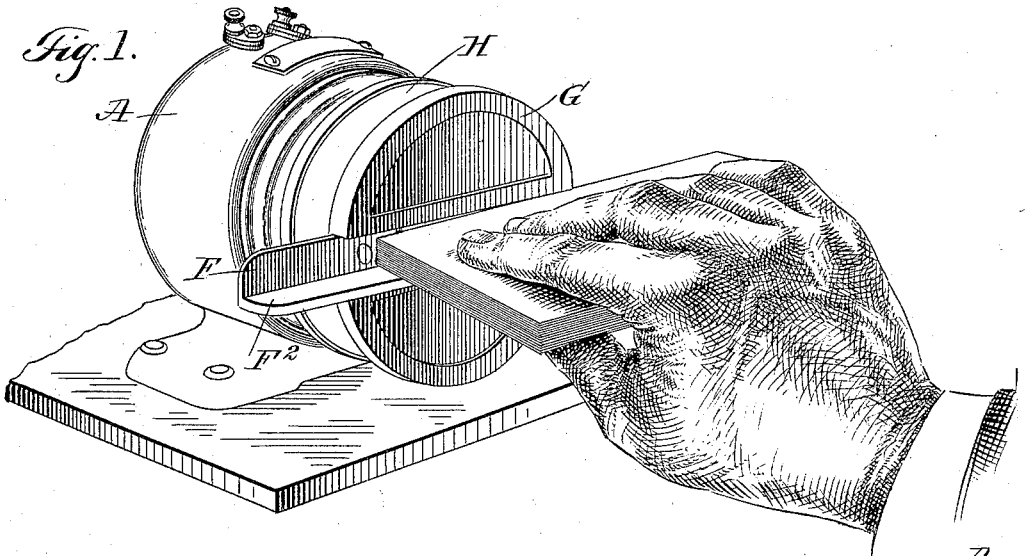
Figure 3:
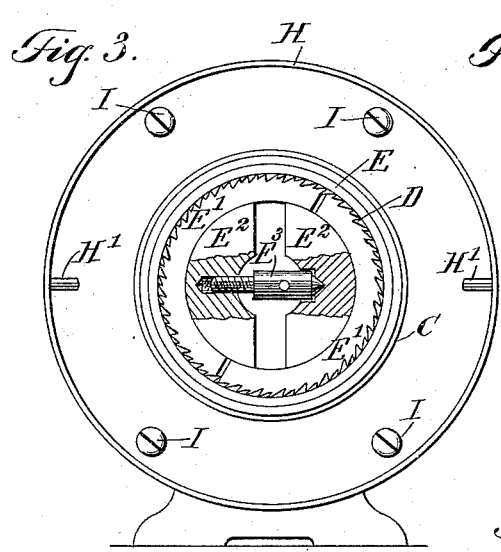
Figure 2:
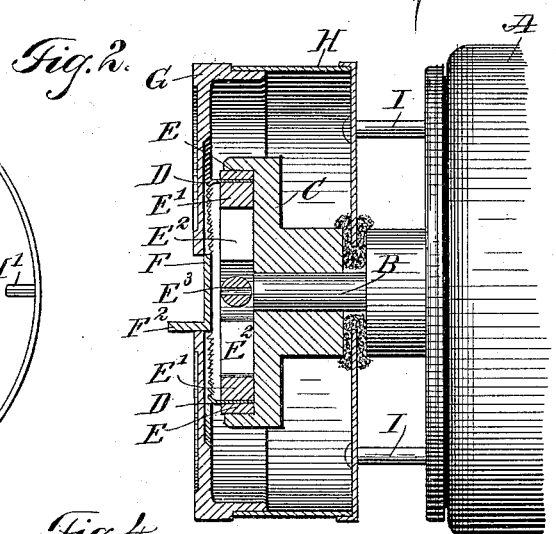
Figure 4:
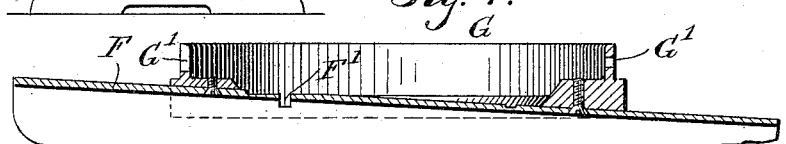

Figure 1 is a perspective view of the improvement. Fig. 2 is a transverse section of the same. Fig. 3 is a front elevation of the same, showing the cover and guide removed and parts broken out; and Fig. 4 is a sectional plan view of the cover and guide.

An electric or other motor A of any approved construction carries at the forward end of its shaft or arbor B a head C, in the front face of which is held an annular cutter D, preferably in the shape of a saw fitted against the inside of a ring E, held in the head C, as plainly shown in the drawings, and the inner face of the saw-blade is engaged by clamping-segments E', pressed apart in firm contact with the saw-blade by jaws E$^2$, of which one is engaged by the threaded end of a screw-rod E$^3$, abutting with its other end against the other jaw, as plainly shown in Fig. 3, so that when the screw-rod E$^3$ is turned the jaws E$^2$ press the segments E' in firm contact with the saw-blade to clamp the latter in position on the ring E. The teeth of the saw are all set toward the inner side of the saw-blade, so that they all point inward, as shown in Fig. 3, and alternate teeth are set at different angles, so that adjacent teeth present a large cutting-surface.

In practice I prefer to employ a flat saw-blade bent into annular shape and fitted into the ring E and clamped thereto by the segments E', as previously explained, so that the saw can be readily removed when worn out and replaced by a new one, and the saw can be very cheaply manufactured.

The teeth of the saw extend at one side of the latter through a slot F'', formed in the back wall of a guide F, secured or formed on the front face of a cover G, having bayonet-slots G' for engagement with pins H', held on a casing H, fastened by stud-bolts I or similar devices to the casing of the motor A, as plainly indicated in the drawings. The guide F has its back wall standing at an angle to the axis of the saw, so that only one side of the teeth projects through the slots F'', while the remaining teeth are within the cover G and casing H. The guide F is provided with a bottom flange F$^2$ for the bunch of letters to rest on, it being understood that when the motor A is set in action and the saw D is rotated then a bunch of letters is moved along the guide F by hand, and one edge of each letter abutting against the back of the guide is acted on by the projecting teeth of the saw D, so that the envelops are cut along the said edges throughout the entire length of the letters, and consequently all the letters in the bunch are simultaneously opened along one edge.

It is understood that in order to insure proper action of the saw on the bunch of letters the edges of the letters to be opened are brought in alinement with each other, so as to fit snugly against the back of the guide F, and then the bunch is moved transversely along the guide into contact with the projecting teeth of the saw to cut the edges open.

By reference to Fig. 4 it will be seen that the slot F'' projects into the bottom flange F$^2$ of the guide F, so that the cuttings or chips produced by the action of the saw-teeth on the envelops are carried to the inside of the casing H and accumulate therein. By removing the cover G from time to time the casing can be cleaned of the cuttings.

The height of the guide F is such as to guide a good-sized bunch of letters at a time, and it is immaterial so far as the proper working of the apparatus is concerned whether the envelops are of different sizes and shapes so long as the envelops have the edges on one side of the bunch properly alined.

Having thus described my invention, I claim as new and desire to secure by Letters Patent—

1. A letter-opener provided with a revoluble annular cutter, and a guide for a bunch of letters to slide in, the guide extending across the front of the cutter and at an angle to the axis of the cutter, as set forth.

2. A letter-opener provided with a revoluble annular cutter, and a guide for a bunch of letters to slide in, the guide extending across the front of the cutter and at an angle to the axis of the cutter, the guide being provided with a slot for one side of the cutter to project through, as set forth.

3. A letter-opener provided with a casing, an arbor mounted to turn in the casing and provided with a head, a saw-blade mounted concentrically in the face of the said head, and a guide arranged across the face of the said head, and provided with a slot for the passage of one side of the saw-blade, as set forth.

4. A letter-opener provided with a casing, an arbor mounted to turn in the casing and provided with a head, a saw-blade mounted concentrically in the face of the said head, and a guide arranged across the face of the said head, and provided with a slot for the passage of one side of the saw-blade, the said guide extending at an angle to the axis of the head, as set forth.

5. A letter-opener provided with a casing, an arbor mounted to turn in the casing and provided with a head, a saw-blade mounted concentrically in the face of the said head, and a guide arranged across the face of the said head, and provided with a slot for the passage of one side of the saw-blade, the said guide having a bottom flange, for the bunch or pack of letters to rest on while moving along the guide, as set forth.

6. A letter-opener having a saw-blade provided with teeth, set to one side of the blade only, as set forth.

7. A letter-opener having a saw-blade provided with teeth, set to one side of the blade only, alternate teeth being set at different angles, to project longer or shorter distances alternately on the said side of the blade, as set forth.

8. A letter-opener provided with a revoluble head, a saw-blade fitted against the inside of the rim of the head, and means for clamping the saw-blade in position in the said head, as set forth.

9. A letter-opener provided with a revoluble head, a saw-blade fitted against the inside of the rim of the head, and means for clamping the saw-blade in position in the said head, the said means comprising segments, jaws, and a screw-rod engaging the said jaws, to force the latter apart against the segments, for the latter to engage the inner face of the blade, to clamp the latter in position on the rim of the said head, as set forth.

10. A letter-opener having a saw-blade arranged in annular shape and provided with teeth all of which are set toward the inner side of said annular blade, as set forth.

11. A letter-opener having a saw-blade arranged in annular shape and provided with teeth all of which are set toward the inner side of the annular blade, alternate teeth being set at different angles, for the purpose set forth.

12. A letter-opener, provided with a revoluble annular cutter in the shape of a saw-blade having its teeth set toward the inner side of the blade only, and a guide for a bunch of letters to slide in, the said guide extending across the front of the cutter and at an angle to the axis of the cutter, the guide being provided with a slot through which the teeth of the cutter project as set forth.

In testimony whereof I have signed my name to this specification in the presence of two subscribing witnesses.

HENRY C. ZENKE.

Witnesses:
  THEO. G. HOSTER,
  JNO. M. RITTER.